US008755348B2

(12) United States Patent
He et al.

(10) Patent No.: US 8,755,348 B2
(45) Date of Patent: Jun. 17, 2014

(54) SEARCH SPACE DETERMINATION

(75) Inventors: Hong He, Beijing (CN); Jong-Kae Fwu, Sunnyvale, CA (US); Yuan Zhu, Beijing (CN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/810,890

(22) PCT Filed: Mar. 28, 2012

(86) PCT No.: PCT/US2012/031039
§ 371 (c)(1),
(2), (4) Date: Jan. 17, 2013

(87) PCT Pub. No.: WO2013/066386
PCT Pub. Date: May 10, 2013

(65) Prior Publication Data
US 2013/0163551 A1 Jun. 27, 2013

Related U.S. Application Data

(60) Provisional application No. 61/556,109, filed on Nov. 4, 2011.

(51) Int. Cl.
*H04W 4/00* (2009.01)
*H04J 3/16* (2006.01)
(52) U.S. Cl.
USPC .......................................... 370/329; 370/346

(58) Field of Classification Search
USPC .................................................. 370/329, 346
See application file for complete search history.

(56) References Cited

U.S. PATENT DOCUMENTS

| 2010/0157922 | A1 | 6/2010 | Kim et al. |
| 2011/0075624 | A1 | 3/2011 | Papasakellariou et al. |
| 2011/0269492 | A1 | 11/2011 | Wang |
| 2013/0003663 | A1* | 1/2013 | Blankenship et al. ........ 370/329 |
| 2013/0039284 | A1* | 2/2013 | Marinier et al. .............. 370/329 |
| 2013/0058285 | A1* | 3/2013 | Koivisto et al. .............. 370/329 |
| 2013/0064196 | A1* | 3/2013 | Gao et al. ..................... 370/329 |

OTHER PUBLICATIONS

International Search Report and Written Opinion mailed Oct. 18, 2012 from International Application No. PCT/US2012/031039.
Nortel Networks, "Control channel design for the support of wider bandwidth for LTE-Advanced," 3GPP, TSG-RAN1 #56, R1-090759, Agenda Item: 12.2, Feb. 9-13, 2009, Athens, Greece, 10 pages.

* cited by examiner

*Primary Examiner* — Mark Rinehart
*Assistant Examiner* — Angel Brockman
(74) *Attorney, Agent, or Firm* — Schwabe, Williamson & Wyatt, P.C.

(57) ABSTRACT

Embodiments of the present disclosure describe apparatuses, systems, methods, and articles of manufacture for identifying search space candidates that may be used in the transmission of downlink control information. Other embodiments may be described and claimed.

21 Claims, 8 Drawing Sheets

US 8,755,348 B2

SEARCH SPACE DETERMINATION

CROSS REFERENCE TO RELATED APPLICATIONS

The present application is a national stage of International Application No. PCT/US2012/031039, filed Mar. 28, 2012, entitled "SEARCH SPACE DETERMINATION," and claims priority to U.S. Provisional Patent Application No. 61/556,109, filed Nov. 4, 2011, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to search space determination in wireless communication networks.

BACKGROUND INFORMATION $3^{rd}$ Generation Partnership Project's (3GPP) long term evolution-advanced (LTE-A) wireless communication standard may be modified to add support for multi-user multiple-input multiple-output (MU-MIMO) systems. As a result, base stations may be able to schedule more mobile devices, e.g., user equipment (UE), into each LTE-A subframe during MU-MIMO operations. Scheduling more UEs may decrease physical downlink control channel (PDCCH) resources available for downlink scheduling. Releases 8, 9, and 10 of PDCCH design in LTE-A may limit the maximum PDCCH size to 3 orthogonal frequency domain multiplexing (OFDM) symbols. However, 3 OFDM symbols may be unlikely to be able to accommodate the potential increased demand for resources associated with MU-MIMO operations. Thus, an OFDM symbol limit of 3, in combination with enablement of MU-MIMO operation, may limit the frequency and scheduling gains that may be available through MU-MIMO operation.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for search space determination in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
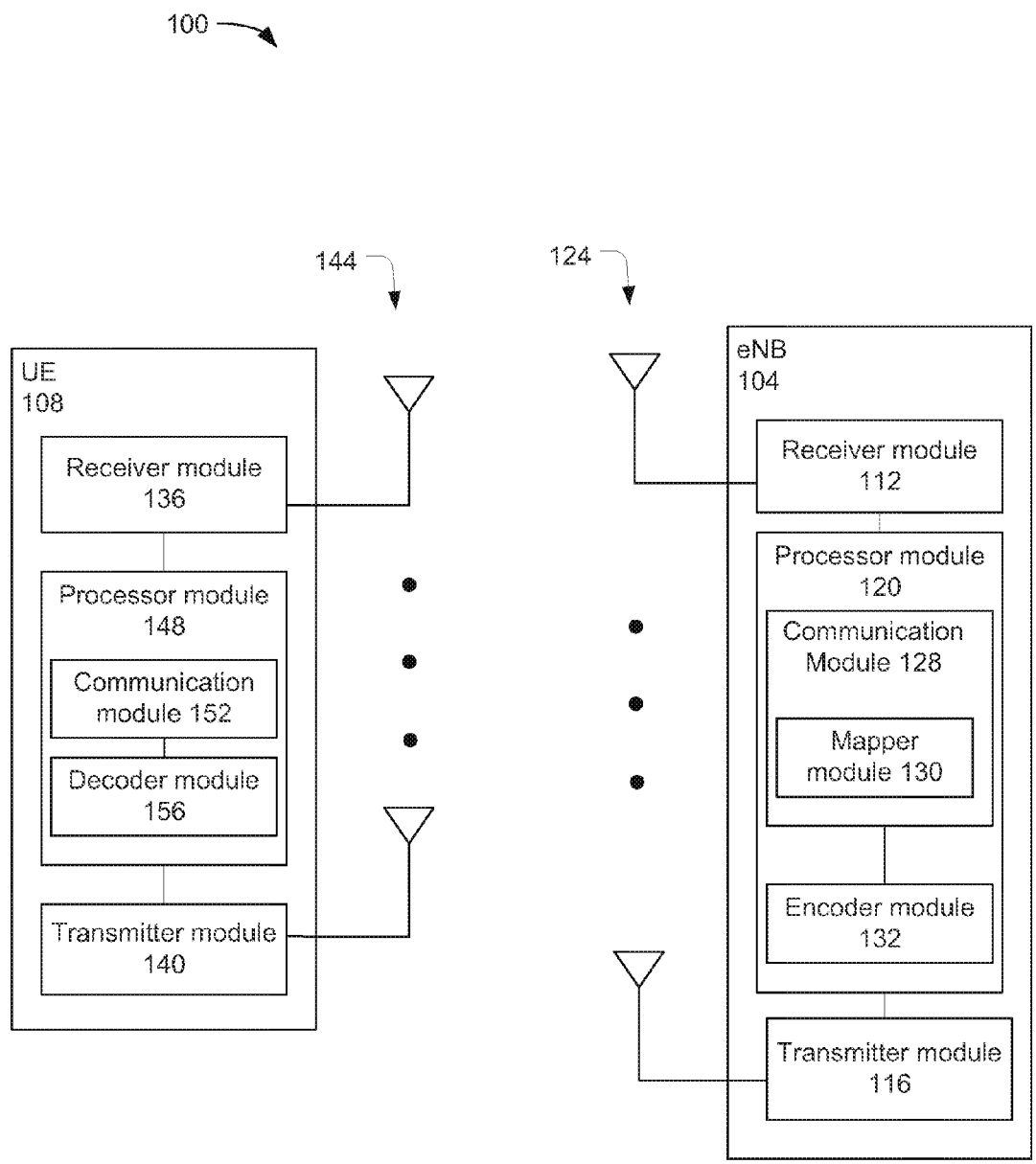
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., enhanced node base station (eNB) 104, configured to wirelessly communicate with a mobile device or terminal, e.g., user equipment (UE) 108. While embodiments of the present invention are described with reference to an LTE network, some embodiments may be used with other types of wireless access networks.

eNB 104 may be configured to overcome the gain limitations associated with using PDCCH to schedule communications with UE 108, e.g., with MU-MIMO operations. In embodiments, eNB 104 may be configured to increase the number of UEs 108 that may be scheduled during LTE wireless communications by expanding downlink control information (DCI) transmissions into physical downlink shared channel (PDSCH) space, which historically may not have been used for such purpose. In particular, eNB 104 may be configured to determine, define, and/or allocate search space candidates (i.e., potential bearers of DCI) by defining a control space in PDSCH space. This new control space may be included within an enhanced-physical downlink control channel (E-PDCCH), at least because E-PDCCH operation may expand and enhance the capability of PDCCH operation.

In embodiments, E-PDCCH may be associated with PDSCH such that E-PDCCH operations consume a portion of PDSCH resource blocks. In other embodiments, resource blocks that were allocated to PDSCH in prior 3GPP LTE releases may be removed from the definition of PDSCH and be allocated to E-PDSCH, as resource blocks that are independent of PDSCH. In embodiments, E-PDCCH may be defined to consume some of the resource blocks allocated to PDCCH and some of the resource blocks allocated to PDSCH such that PDCCH, E-PDCCH, and PDSCH are concurrently allocated some of the same resource blocks.

eNB 104 may include a receiver module 112, a transmitter module 116, and a processor module 120. eNB 104 may use receiver module 112 to receive signals from UE 108. eNB 104 may use transmitter module 116 to transmit signals to UE 108. Receiver module 112 and transmitter module 116 may receive and transmit signals using one or more antennas 124. Processor module 120 may be coupled to receiver module 112 to receive information from UE 108 and may be coupled to transmitter module 116 to transmit information to UE 108.

Processor module 120 may include a communication module 128. Processor module 120 may be configured to initiate and maintain communications with UE 108 via communication module 128. Communication module 128 may include a mapper module 130 configured to map a number of virtual resource blocks (VRBs) associated with a particular search space design to a number of physical resource blocks (PRBs) allocated for the search space. Communication module 128 may be configured to transmit signals to UE 108 through one or more of a PDSCH, PDCCH, and E-PDCCH.

E-PDCCH may be introduced in the PDSCH region, using physical resource block (PRB)-based (instead of control channel element (CCE)-based) multiplexing. E-PDCCH may be used to increase the PDCCH capacity and bolster enhanced inter-cell interference coordination (eICIC) support in heterogeneous network (hetnet) scenarios. The inability to perform ICIC on legacy PDCCH systems may be due to PDCCH interleaving. In other words, PDCCH CCEs that are used for the transmission of DCI formats may be distributed over the whole bandwidth (BW) of the channel in an irregular fashion, and may make ICIC difficult to perform. By contrast, E-PDCCH in the PDSCH region may be PRB-based and therefore extend the benefit supporting frequency-domain ICIC. As will be discussed in more detail below, in embodiments, E-PDCCH may be implemented by defining and/or allocating the search space for UE 104.

Processor module 120 may also include an encoder module 132. Encoder module 132 may be configured as an encoder and may define various parameters of the search space. A search space may be the set of resources to be tracked by UE 108 during PDCCH blind decoding. Search space design may be one of many aspects of E-PDCCH operation. Relay-PDCCH (R-PDCCH) was introduced in release 10 of 3GPP LTE-A and may provide an established basis from which E-PDCCH may be implemented in release 11 of 3GPP LTE-A. However, E-PDCCH may provide significant gain advantages over R-PDCCH. For example, both frequency diversity gain and frequency scheduling gain may be utilized in E-PDCCH operations concurrently. As another example, E-PDCCH may enable UE 108 to fully exploit channel dependent E-PDCCH scheduling gain, which may be useful for smaller aggregation levels (e.g., aggregation levels 1 and 2). As used herein, the aggregation level may be defined as the number of CCEs aggregated to transmit one DCI format. In subsequent figures, embodiments of E-PDCCH search space designs are described. One advantage of the hereinafter described embodiments may be that the search space may be spread across all potential assigned physical resource blocks (PRBs) for E-PDCCH configured by eNB 104 and may enable more UEs to be scheduled over already existing resources.

In LTE release 10, one set of virtual resource blocks (VRBs) for backhaul control information may have been semi-statically configured by higher layers on a Relay-Node (RN) specific basis. Release 8 search space methodology was reused for the R-PDCCH design of LTE release 10. However, few, if any, optimization considerations of utilizing frequency scheduling gain for R-PDCCH were included in release 10. To enable frequency scheduling gain in low aggregation levels, herein described techniques may be used to spread search space candidates across the allocated VRBs.

In the UE 108, processor module 148 may be coupled to receiver module 136 and transmitter module 140 and be configured to decode and encode information transmitted in signals communicated between the UE 108 and the eNB 104. Processor module may include a communication module 152 and a decoder module 156. Processor module 148 may be configured to use communication module 152 to receive data and/or control information from eNB 104 via any one or more of PDCCH, PDSCH, and E-PDCCH. Decoder module 156 may be coupled to communications module 152 and be configured to decode downlink control information (DCI) carried by a number of VRBs. The VRBs may be allocated as search space candidates of the E-PDCCH. Additionally, decoder module 126 may be configured to skip over the one or more VRB gaps that may be positioned between adjacent ones of the search space candidates and check the search space candidates defined by the search space as pertinent to UE 108. By skipping over gaps of VRBs, decoder module 156 may enable UE 108 to reduce computing cycles and reduce power consumption.

Figure 2A:
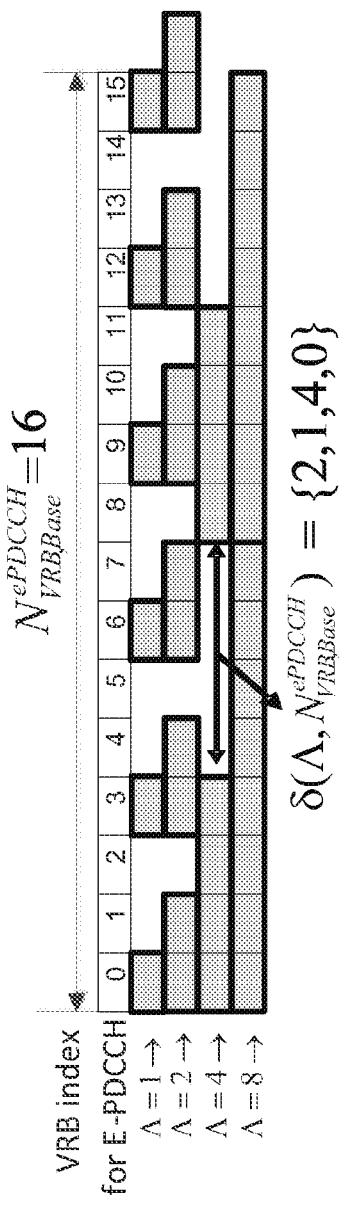
FIGS. 2A-2B illustrate diagrams of search space candidate allocation in accordance with various embodiments.
Figure 2B:
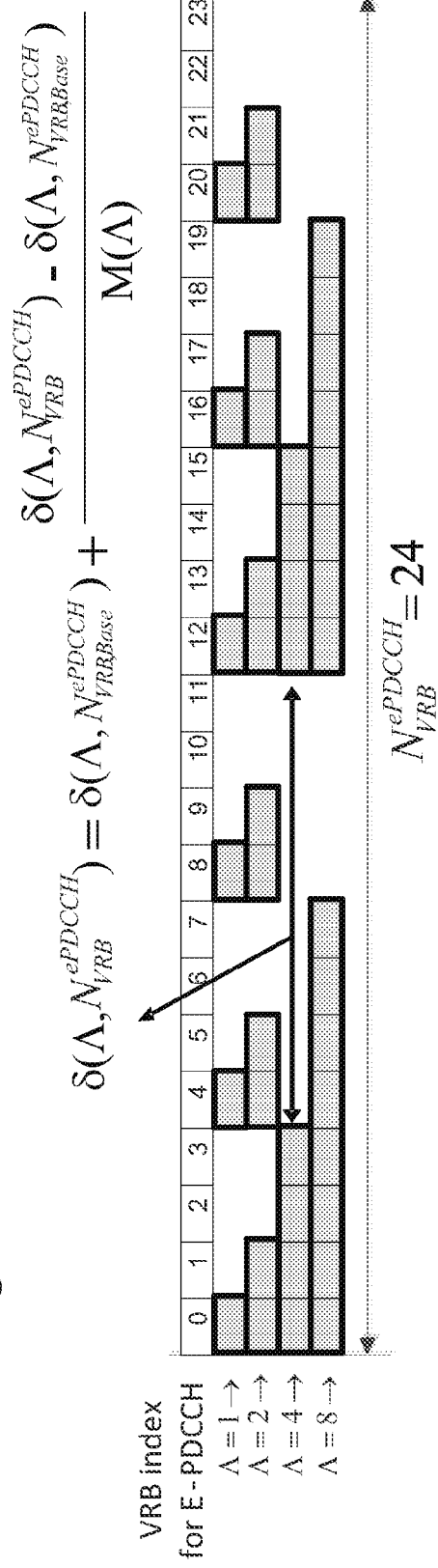

FIGS. 2A and 2B illustrate a search space design that determines a set of search space candidates of E-PDCCH based on an aggregation level of DCI and based on predetermined spacing between adjacent search space candidates, according to various embodiments.

FIGS. 2A and 2B shows a search space design that may be used by encoder module 132 for encoding DCI, in various embodiments. The UE-specific search space $\eta_{VRB}^{E\text{-}PDCCH}(\Lambda,k)$ of E-PDCCH for aggregation levels $\Lambda=\{1,2,4,8\}$ may be defined by a set of E-PDCCH resources in terms of units of VRBs, e.g., 16 VRBs. The UE-specific indexes of VRBs allocated by eNB 104 for potential DCI transmission are given by:

$$\eta_{VRB}^{E\text{-}PDCCH}(\Lambda,k)=((\Lambda+\delta(\Lambda,N_{VRB}^{E\text{-}PDCCH}))\cdot m+i) \bmod N_{VRB}^{E\text{-}PDCCH}.$$ (Equation 1)

In Equation 1, $N_{VRB}^{E\text{-}PDCCH}$ may be the total number of VRBs available as E-PDCCH resources for a specific UE. i may be an index number of aggregation levels $\Lambda$ and may span a set of $i=0,\ldots,\Lambda-1$. $M(\Lambda)$ may be the number of search space candidates to monitor in the given set of E-PDCCH resources. m may index each of the E-PDCCH resources as $m=0,\ldots,M(\Lambda)-1$. The parameter $\delta(\Lambda,N_{VRB}^{E\text{-}PDCCH})$ may be the VRB gap between two continuous search space candidates at aggregation level $\Lambda$ within $N_{VRB}^{E\text{-}PDCCH}$ VRBs configured and/or allocated by eNB 104. In embodiments, $\delta(\Lambda,$ $N_{VRB}^{E-PDCCH}$) may be predefined based for baseline number of VRB, e.g., if $N_{VRB,Base}^{E-PDCCH}=16$.

According to embodiments of the disclosure, eNB 104 may encode DCI into one or more VRBs within evenly distributed search space candidates for aggregation level 1 and 2 according to Equation 1, so that frequency scheduling gain may be achieved by eNB 104 scheduling.

Encoder module 132 of eNB 104 may use Equation 1 to select one or more VRBs, $\eta_{VRB}^{E-PDCCH}(\Lambda,k)$, from a set of E-PDCCH resources, $N_{VRB,Base}^{E-PDCCH}$, so eNB 104 may encode DCI onto selected ones of VRBs of the available resources. eNB 104 may then map the encoded VRBs with a mapper module 130, to PRBs for transmission to UE 108.

eNB 104 may determine the search space candidates of FIG. 2A based on Equation 1. For the search space design of FIG. 2A, eNB 104 may determine that 6 search space candidates may be distributed in each of aggregation levels 1 and 2. eNB 104 may determine that 2 search space candidates may be distributed in each of aggregation levels 4 and 8. eNB 104 may determine that 16 VRBs are allocated as a baseline number of VRBs, $N_{VRB,Base}^{E-PDCCH}$, for the E-PDCCH. eNB 104 may determine the baseline gaps between search space candidates to be: $\delta(\Lambda,N_{VRB,Base}^{E-PDCCH})=\{2,1,4,0\}$. The baseline gaps, $\delta(\Lambda,N_{VRB,Base}^{E-PDCCH})$, may correspond to respective aggregation levels of $\Lambda=\{1,2,4,8\}$. As shown the VRB gap between each continuous or adjacent search space candidate (shown as one or more grey boxes enclosed by a dark-lined box) for aggregation level 1 is 2 VRBs, for aggregation level 2 is 1 VRB, for aggregation level 4 is 4 VRBs, and for aggregation level 8 is 0 VRBs.

eNB 104 may use Equation 1 to determine into which VRBs, $N_{VRB}^{E-PDCCH}(\Lambda,k)$, of the set of VRBs, $N_{VRB,Base}^{E-PDCCH}$, DCI will be encoded. For example, according to Equation 1, eNB 104 may determine that for aggregation level 1, DCI may be encoded into VRBs with index numbers 0, 3, 6, 9, 12, and/or 15, according to one embodiment. eNB 104 may determine that for aggregation level 2, DCI may be encoded into VRBs with index numbers 0, 1, 3, 4, 6, 7, 9, 10, 12, 13, 15, and 16, according to one embodiment. Other aggregation levels are shown in FIG. 2A.

eNB 104 may concurrently transmit DCI of one or more aggregation levels to enable communication between eNB 104 and UE 108. eNB 104 may vary the aggregation level of DCI transmissions based on a power level used for the transmissions. For example, while transmitting at higher power levels, eNB 104 may transmit DCI of aggregation levels 1 and 2, in embodiments. eNB 104 may transmit DCI of aggregation levels 4 and 8 while transmitting at lower power levels, in other embodiments.

eNB 104 may determine search space candidates of FIG. 2B based on Equation 1. With reference to FIG. 2B, for E-PDCCH having a set of resources, e.g. $N_{VRB}^{E-PDCCH}=24$, that is greater than a base set, e.g. $N_{VRB,Base}^{E-PDCCH}=16$, gaps between each of the continuous search space candidates may be determined according to:

$$\delta(\Lambda, N_{VRB}^{E-PDCCH}) = \delta(\Lambda, N_{VRB,Base}^{E-PDCCH}) + \frac{N_{VRB}^{E-PDCCH} - N_{VRB,Base}^{E-PDCCH}}{M(\Lambda)}.$$

(Equation 2)

For Equation 2, the baseline VRB gaps, $\delta(\Lambda, N_{VRB,Base}^{E-PDCCH})$, may be the same as was determined for the search space of FIG. 2A, i.e., $\delta(\Lambda,N_{VRB,Base}^{E-PDCCH})=\{2,1,4,0\}$ or may be different from the baseline VRB gaps of FIG. 2A, i.e., $\delta(\Lambda,N_{VRB,Base}^{E-PDCCH})=\{1,0,4,0\}$, in order to ensure that the lowest VRB index of E-PDCCH search space candidate position is multiple of 2, i.e., always an even number. As discussed above, $M(\Lambda)$ may be the number of search space candidates to monitor in the given search space for a particular aggregation level $\Lambda$.

According to another embodiment, eNB 104 may not use Equation 2 while $N_{VRB}^{E-PDCCH}>16$ to determine the gaps between search space candidates and instead may evenly distribute the candidates between the VRBs allocated to the search space based on a maximum distance each search space candidate may be positioned away from other search space candidates within the VRB resources, $N_{VRB}^{E-PDCCH}$.

According to one embodiment, for 24 E-PDCCH resources, i.e., $N_{VRB}^{E-PDCCH}=24$, eNB 104 may determine the gaps between each of the continuous search space candidates to be $\delta(\Lambda,N_{VRB}^{E-PDCCH})=\{3,2,8,4\}$, for each respective aggregation level $\Lambda=\{1,2,4,8\}$.

eNB 104 may use Equation 1 to determine into which VRBs, $\eta_{VRB}^{E-PDCCH}(\Lambda,k)$, of the set of VRBs, $N_{VRB}^{E-PDCCH}=24$, DCI will be encoded. For example, according to Equation 1, eNB 104 may determine that for aggregation level 1, DCI may be encoded into VRBs with index numbers 0, 4, 8, 12, 16, and 20, according to one embodiment. eNB 104 may determine that for aggregation level 2, DCI may be encoded into VRBs with index numbers 0, 1, 4, 5, 8, 9, 12, 13, 16, 17, 20, and 21, according to one embodiment. Example distributions of search candidates in E-PDCCH resources, $N_{VRB}^{E-PDCCH}$, for aggregation levels 4 and 8 are shown in FIG. 2B.

Figure 3A:
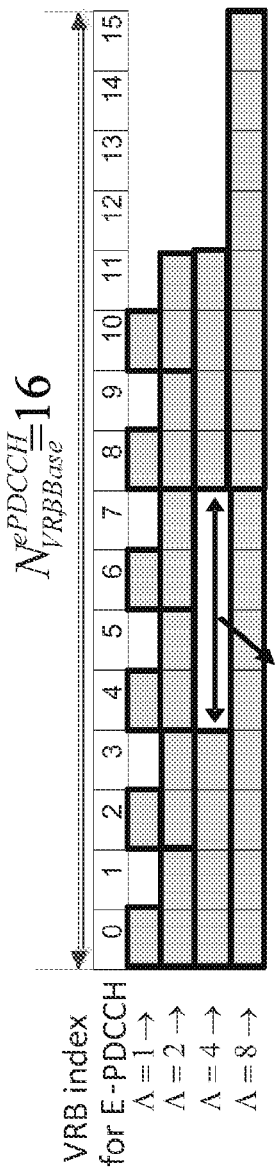
FIGS. 3A-3B illustrate diagrams of search space candidate allocation in accordance with various embodiments.

FIG. 3A shows a search space design in which eNB 104 determines, based on Equation 1, determines the VRB baseline gaps to be $\delta(\Lambda,N_{VRB,Base}^{E-PDCCH})=\{1,0,4,0\}$, given 16 VRBs configured for E-PDCCH transmission, i.e., $N_{VRB,Base}^{E-PDCCH}=16$. As shown the VRB gap between each continuous or adjacent search space candidates (shown as one or more grey boxes) for aggregation level 1 is 1 VRB, for aggregation level 2 is 0 VRBs, for aggregation level 4 is 4 VRBs, and for aggregation level 8 is 0 VRBs.

eNB 104 may use Equation 1 to determine into which VRBs, $\eta_{VRB}^{E-PDCCH}(\Lambda,k)$, of the set of VRBs, $N_{VRB,Base}^{E-PDCCH}=16$, DCI will be encoded. For example, according to Equation 1, eNB 104 may determine that for aggregation level 1, DCI may be encoded into VRBs with index numbers 0, 2, 4, 6, 8, and 10, according to one embodiment. eNB 104 may determine that for aggregation level 2, DCI may be encoded into VRBs with index numbers 0-11, according to one embodiment. Example distributions of E-PDCCH candidates in search space resources, $N_{VRB,Base}^{E-PDCCH}$, for aggregation levels 4 and 8 are shown in FIG. 3A.

Figure 3B:
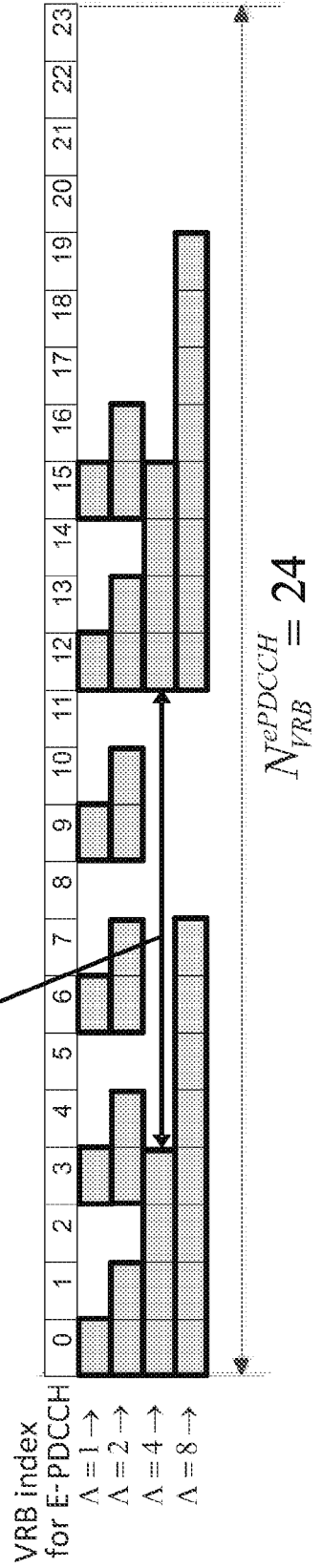

FIG. 3B shows another search space design that may be based on Equation 1 in the event that eNB 104 configures 24 VRBs for E-PDCCH transmission, i.e., $N_{VRB}^{E-PDCCH}=24$. The gaps between each of the adjacent search space candidates for a set of VRB resources greater than a base set of VRB resources, e.g., $N_{VRB,Base}^{E-PDCCH}=16$, may be determined by eNB 104 according to Equation 2, as discussed above.

For the search space design shown in FIG. 3B, eNB 104 may use Equation 2 to determine that VRB gaps, $\delta(\Lambda, N_{VRB}^{E-PDCCH})$, may be $\{2,1,8,4\}$ for respective aggregation levels $\{1,2,4,8\}$, according to one embodiment.

eNB 104 may use Equation 1 to determine into which VRBs, $\eta_{VRB}^{E-PDCCH}(\Lambda,k)$, of the set of VRBs, $N_{VRB}^{E-PDCCH}$, DCI will be encoded. For example, according to Equation 1, eNB 104 may determine that for aggregation level 1, DCI may be encoded into VRBs with index numbers 0, 3, 6, 9, 12, and 15, according to one embodiment. eNB 104 may determine that for aggregation level 2, DCI may be encoded into VRBs with index numbers 0, 1, 3, 4, 6, 7, 9, 10, 12, 13, 15, and 16, according to one embodiment. Search space candidates for other aggregation levels are shown in FIG. 3B.

Figure 4A:
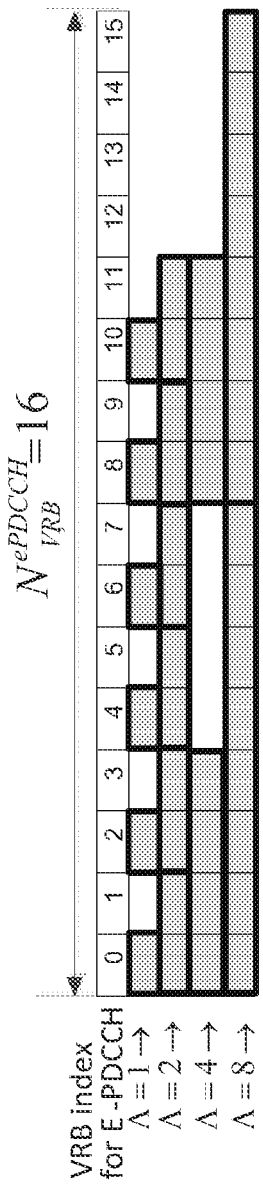
FIGS. 4A-4B illustrate diagrams of search space candidate allocation in accordance with various embodiments.

FIG. 4A shows a search space design that eNB 104 may define in accordance with an equation that is different than Equation 1. According to various embodiments, eNB 104 may distribute search space candidates evenly within aggregation levels 1 and 2, according to:

$$n_{VRB}^{ePDCCH}(\Lambda, k) = \begin{cases} (\Delta \cdot m + i) \bmod N_{VRB}^{ePDCCH} & \text{if } \Lambda < \Delta \\ (\Lambda \cdot m + i) \bmod N_{VRB}^{ePDCCH} & \text{otherwise.} \end{cases} \quad \text{(Equation 3)}$$

In Equation 3, $\eta_{VRB}^{E\text{-}PDCCH}(\Lambda,k)$ may still represent an index number of the VRB into which DCI may be encoded.

$$\Delta = \left\lceil \frac{N_{VRB}^{ePDCCH}}{M(\Lambda)} \right\rceil.$$

$N_{VRB}^{E\text{-}PDCCH}$ and $M(\Lambda)$ may be the same as discussed above. FIG. 4A shows that if $N_{VRB}^{E\text{-}PDCCH}=16$, and aggregation levels {1,2,4,8} include {6,6,2,2} search space candidates, respectively, eNB 104 may determine the gaps between adjacent search space candidates to be at least {1,0,4,0} for corresponding aggregation levels {1,2,4,8}, according to one embodiment.

eNB 104 may use Equation 3 to determine the VRB index numbers into which DCI may be encoded, as shown in FIG. 4A. For example, according to Equation 3, eNB 104 may determine that for aggregation level 1, DCI may be encoded into VRBs with index numbers 0, 2, 4, 6, 8, 10, according to one embodiment. eNB 104 may determine that for aggregation level 2, DCI may be encoded into VRBs with index numbers 0-11, according to one embodiment. Example distributions of search space candidates in E-PDCCH resources, $N_{VRB}^{E\text{-}PDCCH}$, for aggregation levels 4 and 8 are shown in FIG. 4A.

Figure 4B:
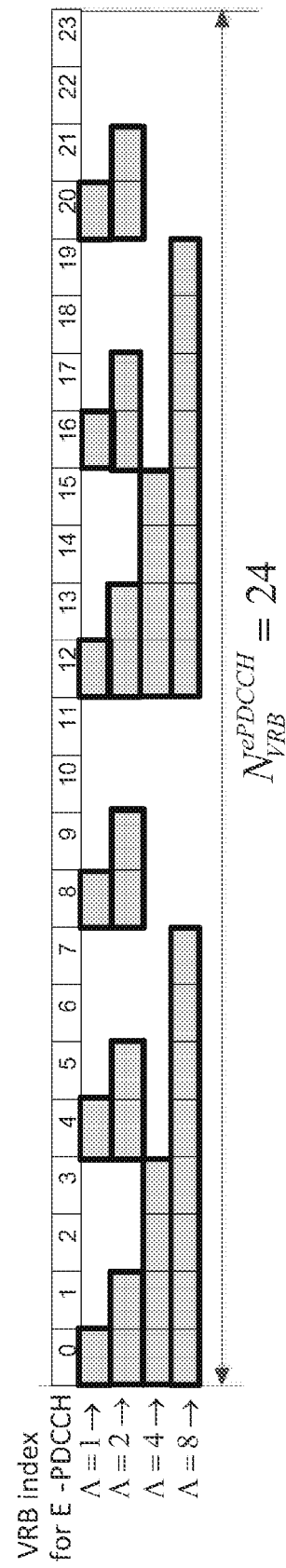

FIG. 4B shows a search space design that eNB 104 may define by using Equation 3, if $N_{VRB}^{E\text{-}PDCCH}=24$. FIG. 4A shows that if $N_{VRB}^{E\text{-}PDCCH}=24$, and aggregation levels {1,2, 4,8} include {6,6,2,2} search space candidates, respectively, eNB 104 may determine the gaps between adjacent search space candidates to be {3,2,8,4} for corresponding aggregation levels {1,2,4,8}, according to one embodiment.

eNB 104 may use Equation 3 to determine the VRB index numbers into which DCI may be encoded, as shown in FIG. 4B. For example, according to Equation 3, eNB 104 may determine that for aggregation level 1, DCI may be encoded into VRBs with index numbers 0, 4, 8, 12, 16, and 20, according to one embodiment. eNB 104 may determine that for aggregation level 2, DCI may be encoded into VRBs with index numbers 0, 1, 4, 5, 8, 9, 12, 13, 16, 17, 20, 21, according to one embodiment. Example distributions of E-PDCCH candidates in E-PDCCH resources, $N_{VRB}^{E\text{-}PDCCH}$, for aggregation levels 4 and 8 are shown in FIG. 4B.

Figure 5:
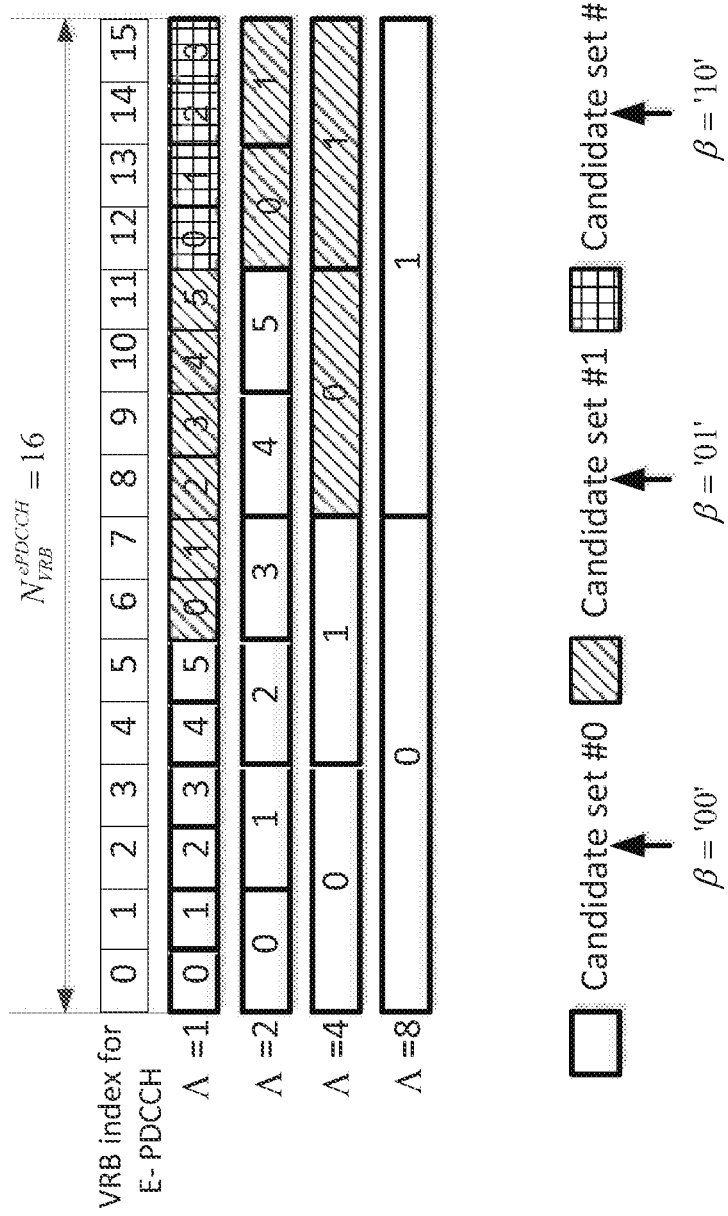
FIG. 5 illustrates a diagram of a search space candidate allocation in accordance with various embodiments.

FIG. 5 shows a search space design that eNB 104 may define by using an equation other than Equations 1 and 3. According to one embodiment, eNB 104 may provide information to UE 108 that indicates where a search space candidate set will begin and how many VRBs the search space candidate set will occupy. eNB 104 may provide a 2-bit candidate identifier, such as $\beta(\Lambda)$, to UE 108 via message authentication code (MAC) or radio resource control (RRC) signaling. eNB 104 may determine search space candidate allocations according to:

$$\eta_{VRB}^{E\text{-}PDCCH}(\Lambda,k) = (\Lambda \cdot m + i + \Lambda \cdot M(\Lambda) \cdot \beta(\Lambda)) \bmod N_{VRB}^{E\text{-}PDCCH}. \quad \text{(Equation 4)}$$

Where $\beta(\Lambda)$ may equal "00" for a candidate set 0, "01" for a candidate set 1, and "10" for a candidate set 2. More or less bits may be used by the eNB 104 to indicate more or less search space candidate sets than are shown in FIG. 5. The other parameters of Equation 4 may have the same meaning as above.

The above-described techniques expand the capability of PDCCH by using E-PDCCH to schedule DCI for UEs, in various embodiments. Such an approach may enable eNB 104 to exercise frequency selective scheduling to increase frequency selection gains and frequency diversity gains, according to various embodiments.

Figure 6:
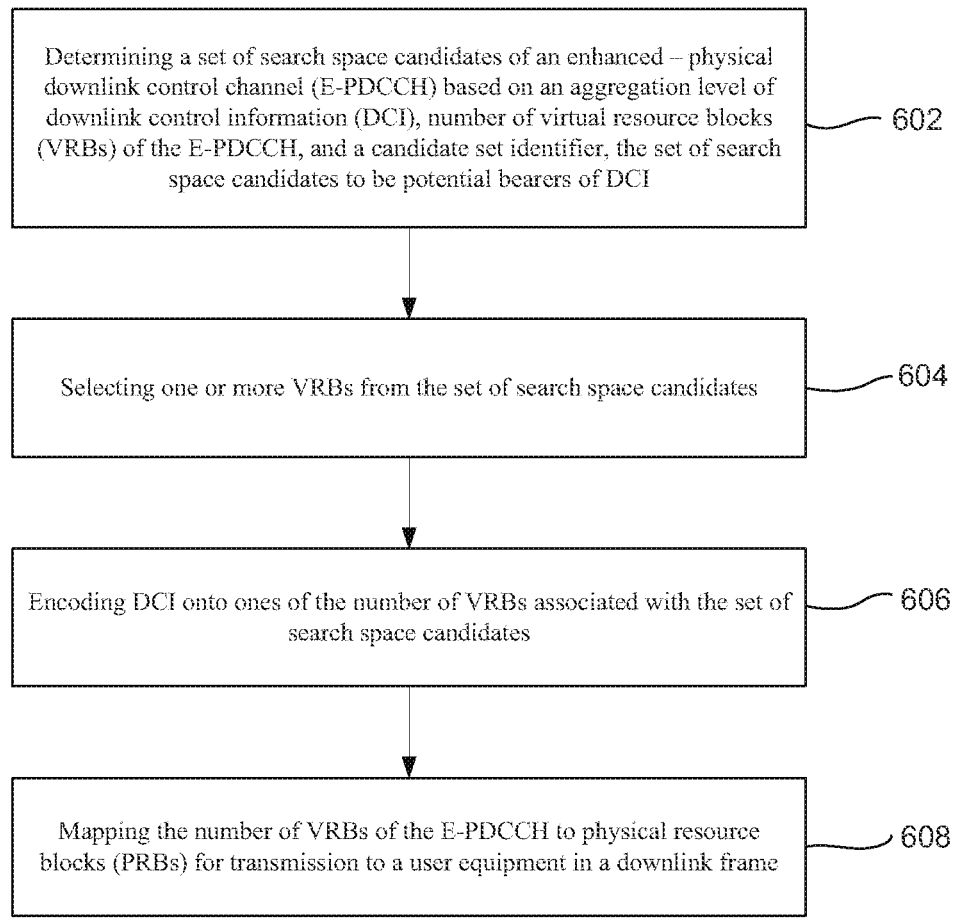
FIG. 6 illustrates a flow diagram of a method of operating a base station in accordance with various embodiments.

FIG. 6 shows a flow diagram of a method of operating eNB 104, according to embodiments.

Block 602 may include determining a set of search space candidates of an E-PDCCH based on an aggregation level of DCI, a number of VRBs of the E-PDCCH, and a candidate set identifier, the set of search space candidates to be potential bearers of DCI. In embodiments, encoder module 132 may perform the determining. In other embodiments, determining the set of search space candidates may be based on $\eta_{VRB}^{E\text{-}PDCCH}(\Lambda,k) = (\Lambda \cdot m + i + \Lambda \cdot M(\Lambda) \cdot \beta(\Lambda)) \bmod N_{VRB}^{E\text{-}PDCCH}$, wherein $\eta_{VRB}^{E\text{-}PDCCH}(\Lambda,k)$ is an index number of one of the number of VRBs, wherein $\beta(\Lambda)$ is the candidate set identifier, wherein $\Lambda$ is the aggregation level of DCI, wherein $N_{VRB}^{E\text{-}PDCCH}$ is the number of the VRBs, wherein m=0, . . . , M($\Lambda$)–1 and M($\Lambda$) is a number of search space candidates of the set to monitor, wherein i=0, . . . , ($\Lambda$–1).

Block 604 may include selecting one or more VRBs from the set of search space candidates.

Block 606 may include encoding DCI onto ones of the number of VRBs associated with the set of search space candidates.

Block 608 may include mapping the number of VRBs of the E-PDCCH to physical resource blocks (PRBs) for transmission to a user equipment in a downlink frame.

Figure 7:
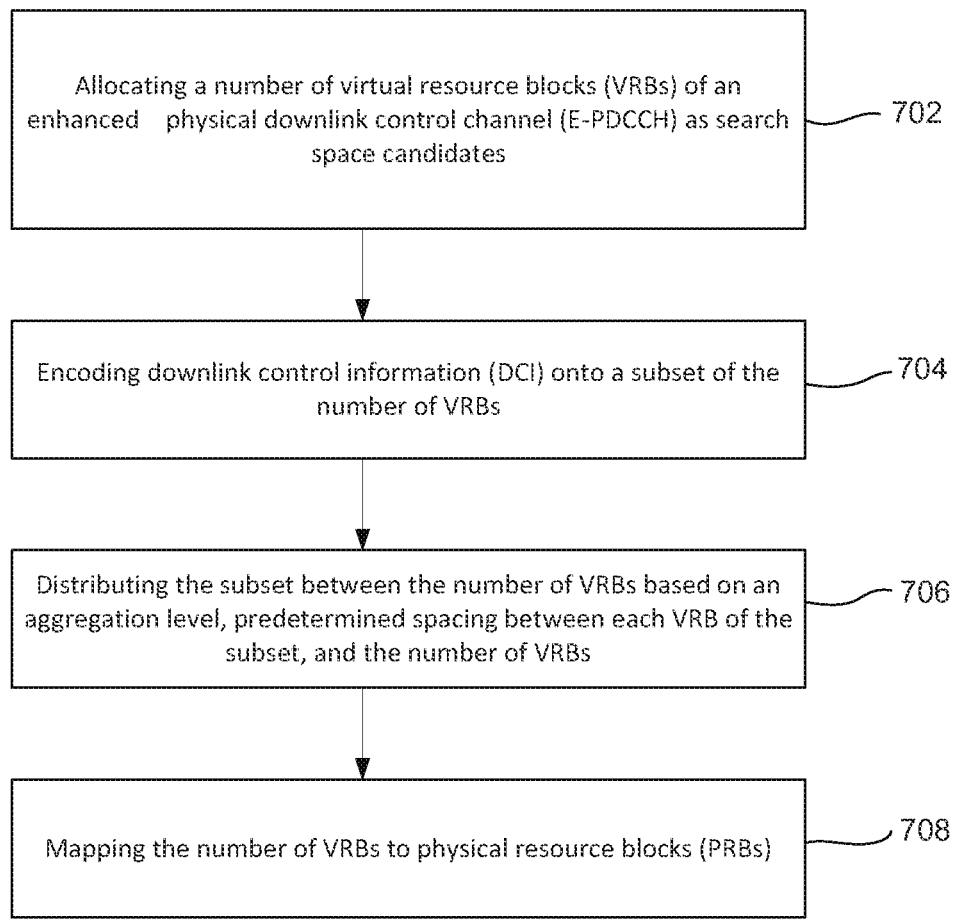
FIG. 7 illustrates a flow diagram of a method of operating a base station in accordance with various embodiments.

FIG. 7 shows a flow diagram of a method of operating eNB 104, according to embodiments.

Block 702 may include determining a set of search space candidates of an E-PDCCH based on an aggregation level of DCI, a number of VRBs of the E-PDCCH, and a candidate set identifier, the set of search space candidates to be potential bearers of DCI.

Block 704 may include selecting one or more VRBs from the set of search space candidates.

Block 706 may include encoding DCI onto a subset of the number of VRBs associated with the set of search space candidates. In embodiments, encoding may include distributing the subset with equal predetermined spacing between the number of VRBs.

Figure 8:
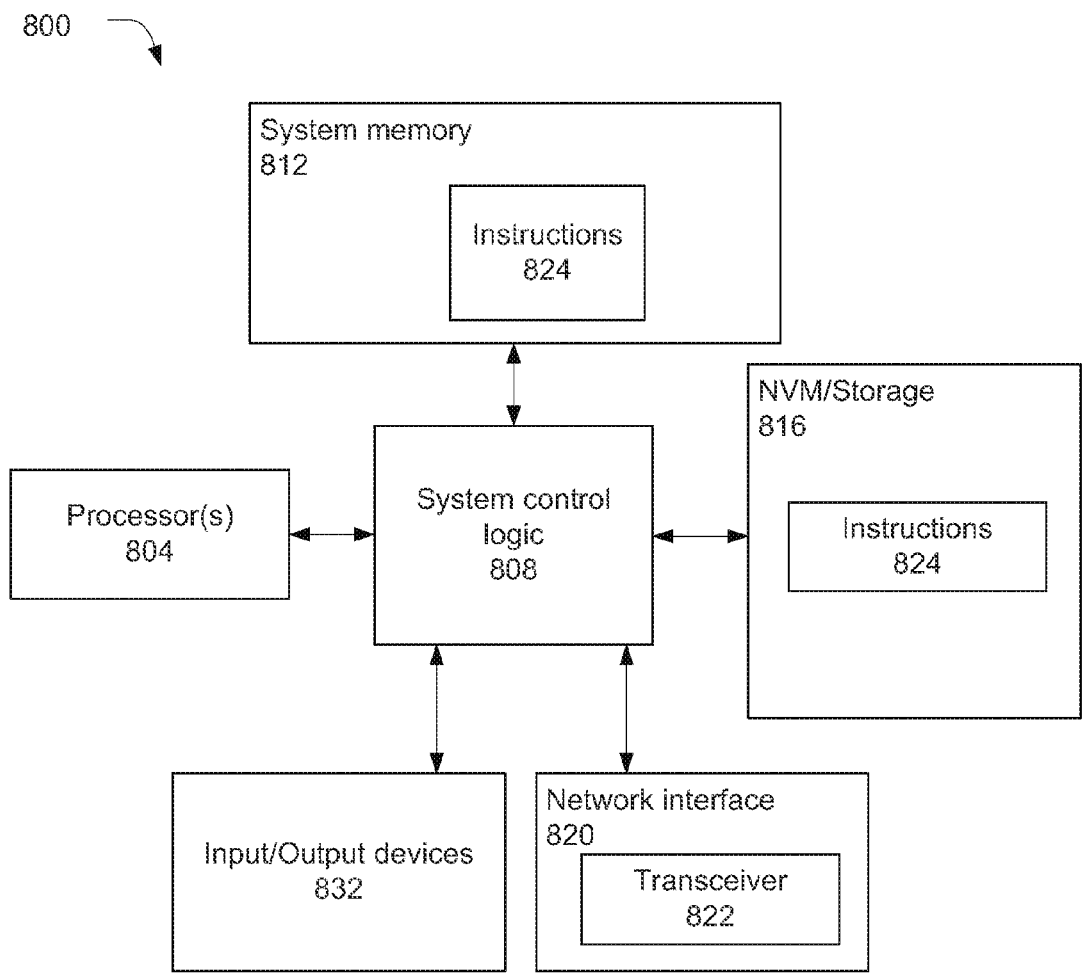
FIG. 8 schematically depicts an example system in accordance with various embodiments.

Block 708 may include mapping the number of VRBs of the E-PDCCH to physical resource blocks (PRBs) for transmission to a user equipment in a downlink frame.

eNB 104 and UE 108 described herein may be implemented into a system using any suitable hardware and/or software to configure as desired. FIG. 8 illustrates, for one embodiment, an example system 800 comprising one or more processor(s) 804, system control logic 808 coupled with at least one of the processor(s) 804, system memory 812 coupled with system control logic 808, non-volatile memory (NVM)/storage 816 coupled with system control logic 808, and a network interface 820 coupled with system control logic 808.

Processor(s) 804 may include one or more single-core or multi-core processors. Processor(s) 804 may include any combination of general-purpose processors and dedicated processors (e.g., graphics processors, application processors, baseband processors, etc.). In an embodiment in which the system 800 implements UE 108, processors(s) 804 may include processor module 148 and be configured to identify and decode search space candidates of the embodiments of FIGS. 2-5 in accordance with various embodiments. In an embodiment in which the system 800 implements eNB 104, processor(s) 804 may include processor module 120 and be configured to identify and encode DCI into search space candidates of the embodiments of FIGS. 2-5 in accordance with various embodiments.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812. System memory 812 may be used to load and store data and/or instructions, for example, for system 800. System memory 812 for one embodiment may include any suitable volatile memory, such as suitable dynamic random access memory (DRAM), for example.

NVM/storage 816 may include one or more tangible, non-transitory computer-readable media used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 816 may include a storage resource physically part of a device on which the system 800 is installed or it may be accessible by, but not necessarily a part of, the device. For example, the NVM/storage 816 may be accessed over a network via the network interface 820.

System memory 812 and NVM/storage 816 may respectively include, in particular, temporal and persistent copies of instructions 824. Instructions 824 may include instructions that when executed by at least one of the processor(s) 804 result in the system 800 implementing a one of the search space designs of FIGS. 2-5 and/or the methods of FIG. 6-7, described herein. In some embodiments, instructions 824, or hardware, firmware, and/or software components thereof, may additionally/alternatively be located in the system control logic 808, the network interface 820, and/or the processor(s) 804.

Network interface 820 may have a transceiver 822 to provide a radio interface for system 800 to communicate over one or more network(s) and/or with any other suitable device. The transceiver 822 may be implement receiver module 112 and/or transmitter module 116. In various embodiments, the transceiver 822 may be integrated with other components of system 800. For example, the transceiver 822 may include a processor of the processor(s) 804, memory of the system memory 812, and NVM/Storage of NVM/Storage 816. Network interface 820 may include any suitable hardware and/or firmware. Network interface 820 may include a plurality of antennas to provide a multiple input, multiple output radio interface. Network interface 820 for one embodiment may include, for example, a network adapter, a wireless network adapter, a telephone modem, and/or a wireless modem.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

The system 800 may further include input/output (I/O) devices 832. The I/O devices 832 may include user interfaces designed to enable user interaction with the system 800, peripheral component interfaces designed to enable peripheral component interaction with the system 800, and/or sensors designed to determine environmental conditions and/or location information related to the system 800.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 820 to communicate with components of a positioning network, e.g., a global positioning system (GPS) satellite.

In various embodiments, the system 800 may be a mobile computing device such as, but not limited to, a laptop computing device, a tablet computing device, a netbook, a smartphone, etc. In various embodiments, system 800 may have more or less components, and/or different architectures.

According to various example embodiments, an apparatus may include an encoder configured to determine a set of search space candidates of an enhanced physical downlink control channel (E-PDCCH) based on an aggregation level of downlink control information (DCI), predetermined spacing between adjacent search space candidates, and a number of virtual resource blocks (VRBs) of the E-PDCCH, the set of search space candidates to be potential bearers of DCI. The encoder may be configured to select one or more VRBs from the set of search space candidates, and encode DCI onto the selected VRBs. The apparatus may also include a mapper configured to map the VRBs of the E-PDCCH to physical resource blocks (PRBs) for transmission to a user equipment in a downlink frame.

In embodiments, the apparatus may include an eNodeB.

In embodiments, the PRBs may include a number of resource blocks from a physical downlink shared channel (PDSCH) associated with the E-PDCCH.

In embodiments, the PDSCH may be defined by release 10 of 3rd Generation Partnership Project's (3GPP) long term evolution advanced (LTE-A) communication standard.

In embodiments, the predetermined spacing between the selected VRBs may be based on an even distribution of the selected VRBs between the number of VRBs of the E-PDCCH.

In embodiments, the encoder may be further configured to determine the predetermined spacing between the selected VRBs based on the aggregation level of the DCI.

In embodiments, the aggregation level may be one of multiple DCI aggregation levels including a first, second, third, and fourth DCI aggregation level.

In embodiments, the encoder may be configured to select one or more VRBs from the adjacent search space candidates associated with the aggregation level.

In embodiments, the encoder may be configured to select one or more VRBs from the set of search space candidates to ensure a lowest index of VRBs for each E-PDCCH transmission is a multiple of 2.

In embodiments, the encoder may be configured to select one or more VRBs from the set of search space candidates to be potential bearers of DCI to ensure the lowest index of VRBs for each E-PDCCH transmission is a multiple of 2 based on:
$\eta_{VRB}^{E\text{-}PDCCH}(\Lambda,k)=((\Lambda+\delta(\Lambda,N_{VRB}^{E\text{-}PDCCH}))\cdot m+i)\mod N_{VRB}^{E\text{-}PDCCH}$. $\Lambda$ may be one of multiple aggregation levels. $\eta_{VRB}^{E\text{-}PDCCH}(\Lambda,k)$ may be an index number of one of the number of VRBs for E-PDCCH transmission associated with the aggregation level $\Lambda$ at a subframe k.

$$\delta(\Lambda, N_{VRB}^{E\text{-}PDCCH}) = \delta(\Lambda, N_{VRB,Base}^{E\text{-}PDCCH}) + \frac{N_{VRB}^{E\text{-}PDCCH} - N_{VRB,Base}^{E\text{-}PDCCH}}{M(\Lambda)}$$

may be the VRB spacing between adjacent search space candidates associated with the one of multiple aggregation levels $\Lambda$. $\delta(\Lambda,N_{VRB}^{E\text{-}PDCCH})$ may be one parameter predefined by higher layer signaling for VRB spacing calculation. $N_{VRB}^{E\text{-}PDCCH}$ may be the number of the VRBs allocated for E-PDCCH transmission. $m=0, \ldots, M(\Lambda)-1$. $M(\Lambda)$ may be a number of the selected VRBs associated with the one of the multiple aggregation levels $\Lambda$. $i=0, \ldots, (\Lambda-1)$.

In embodiments, $N_{VRB,Base}^{E\text{-}PDCCH}$ may be a baseline number of VRBs, and the encoder may be further configured to insert additional predetermined spacing between the selected VRBs based on a difference between the number of VRBs $N_{RB}^{E\text{-}PDCCH}$ and the baseline number $N_{VRB,Base}^{E\text{-}PDCCH}$, if the number of VRBs $N_{VRB}^{E\text{-}PDCCH}$ is greater than $N_{VRB,Base}^{E\text{-}PDCCH}$.

In embodiments, the encoder may be configured to select one or more VRBs from the set of search space candidates to be potential bearers of DCI based on: $\eta_{VRB}^{E\text{-}PDCCH}(\Lambda,k)=(\Delta\cdot m+i)\mod N_{VRB}^{E\text{-}PDCCH}$, if $$\Lambda < \frac{N_{VRB}^{E\text{-}PDCCH}}{M(\Lambda)}.$$

$\Lambda$ may be one of multiple aggregation levels. $\eta_{VRB}^{E\text{-}PDCCH}(\Lambda,k)$ may be an index number of one of the number of VRBs for E-PDCCH transmission associated with the one of the multiple aggregation levels $\Lambda$ at subframe k, wherein $$\Delta = \frac{N_{VRB}^{E\text{-}PDCCH}}{M(\Lambda)},$$

wherein $N_{VRB}^{E\text{-}PDCCH}$ is the number of the VRBs allocated for E-PDCCH transmission, wherein $m=0, \ldots, M(\Lambda)-1$. $M(\Lambda)$ is a number of the selected VRBs associated with the one of the multiple aggregations levels $\Lambda$. $i=0, \ldots, (\Lambda-1)$.

In embodiments, the encoder may be configured to select one or more VRBs from the set of search space candidates to be potential bearers of DCI based on: $\eta_{VRB}^{E\text{-}PDCCH}(\Lambda,k)=(\Lambda\cdot m+i)\mod N_{VRB}^{E\text{-}PDCCH}$, if $$\Lambda >= \frac{N_{VRB}^{E\text{-}PDCCH}}{M(\Lambda)}.$$

$\Lambda$ may be one of multiple aggregation levels. $\eta_{VRB}^{E\text{-}PDCCH}(\Lambda,k)$ may be an index number of one of the number of VRBs for E-PDCCH transmission associated with the one of the multiple aggregation levels $\Lambda$ at a subframe k. $N_{VRB}^{E\text{-}PDCCH}$ may be the number of the VRBs allocated for E-PDCCH transmission. $m=0, \ldots, M(\Lambda)-1$. $M(\Lambda)$ may be a number of the selected VRBs associated with $\Lambda$. $i=0, \ldots, (\Lambda-1)$.

In embodiments, the encoder may be configured to select one or more VRBs from the set of search space candidates based on: $\eta_{VRB}^{E\text{-}PDCCH}(\Lambda,k)=((\Lambda+\delta(\Lambda,N_{VRB}^{E\text{-}PDCCH}))\cdot m+i)\mod N_{VRB}^{E\text{-}PDCCH}$. $\Lambda$ may be one of multiple aggregation levels. $\eta_{VRB}^{E\text{-}PDCCH}(\Lambda,k)$ may be an index number of one of the number of VRBs to receive DCI associated with the one of the multiple aggregation levels $\Lambda$ at a subframe k. $N_{VRB}^{E\text{-}PDCCH}$ may be the number of the VRBs, wherein $\delta(\Lambda, N_{VRB}^{E\text{-}PDCCH})$ may be VRB spacing between the adjacent search space candidates associated with the one of the multiple aggregation levels $\Lambda$. $m=0, \ldots, M(\Lambda)-1$ and $M(\Lambda)$ may be a number of the selected VRBs associated with the one of the multiple aggregation levels $\Lambda$. $i=0, \ldots, (\Lambda-1)$.

In embodiments, the encoder may be configured to select one or more VRBs from the set of search space candidates based on: $\eta_{VRB}^{E\text{-}PDCCH}(\Lambda,k)=(\Lambda\cdot m+i+\Lambda\cdot M(\Lambda)\cdot\beta(\Lambda))\mod N_{VRB}^{E\text{-}PDCCH}$. $\Lambda$ is the aggregation level of DCI. $\eta_{VRB}^{E\text{-}PDCCH}(\Lambda,k$ may be an index number of one of the number of VRBs for E-PDCCH transmission associated with the aggregation level $\Lambda$ at subframe k. $\beta(\Lambda)$ may be the candidate set identifier. $N_{VRB}^{E\text{-}PDCCH}$ may be the number of the VRBs. $m=0, \ldots, M(\Lambda)-1$ and $M(\Lambda)$ may be a number of the selected VRBs associated with $\Lambda$. $i=0, \ldots, (\Lambda-1)$.

According to various example embodiments, a base station may include an antenna, and any of the disclosed example embodiments of an apparatus.

According to various example embodiments, an article of manufacture having one or more computer readable media may include a number of instructions which, when executed by one or more processors, may cause an apparatus to determine a set of search space candidates of an enhanced—physical downlink control channel (E-PDCCH) based on an aggregation level of downlink control information (DCI), number of virtual resource blocks (VRBs) of the E-PDCCH, and a candidate set identifier, the set of search space candidates to be potential bearers of DCI. The instructions may cause the apparatus to select one or more VRBs from the set of search space candidates, and encode DCI onto ones of the number of VRBs associated with the set of search space candidates. The instructions may cause the apparatus to map the number of VRBs of the E-PDCCH to physical resource blocks (PRBs) for transmission to a user equipment in a downlink frame.

In embodiments, the apparatus may include an eNodeB.

In embodiments, the instructions may cause an encoder module of the apparatus to determine the set of search space candidates, select the one or more VRBs, and encode the DCI.

In embodiments, the instructions may cause the one or more processors to distribute the subset with equal predetermined spacing between the number of VRBs.

According to various example embodiments, a base station may include an antenna, and a computing system configured to execute instructions of an article of manufacture disclosed in other embodiments.

According to various example embodiments, an apparatus may include a communications module configured to receive one or more downlink transmissions from a base station via an enhanced-physical downlink control channel (E-PDCCH). The apparatus may include a decoder module coupled to the communications module and configured to identify a set of search space candidates based on aggregation levels of downlink control information (DCI) and a number of virtual resource blocks (VRBs) of the E-PDCCH, and configured to blindly decode the set of search space candidates to retrieve the DCI.

In embodiments, the decoder module may be further configured to determine a number of gaps of VRBs between adjacent ones of the search space candidates based on the aggregation levels and the number of VRBs.

In embodiments, the search space candidates may have been equally spaced among the number of VRBs in a first and a second of the aggregations levels.

In embodiments, one of the decoder module or the communications module may determine which of the aggregation levels of DCI to decode based on a strength of a received communication signal from an eNodeB.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus comprising:
an encoder configured to:
determine a set of search space candidates of an enhanced-physical downlink control channel (E-PDCCH) based on an aggregation level of downlink control information (DCI), predetermined spacing between adjacent search space candidates, and a number of virtual resource blocks (VRBs) of the E-PDCCH, the set of search space candidates to be potential bearers of DCI;
select one or more VRBs from the set of search space candidates; and
encode DCI onto the selected VRBs; and
a mapper configured to map the VRBs of the E-PDCCH to physical resource blocks (PRBs) for transmission to a user equipment in a downlink frame,
wherein the predetermined spacing is to provide an even distribution of the search space candidates across VRBs of the E-PDCCH to enable a frequency scheduling gain.

2. The apparatus of claim 1, wherein the apparatus includes an eNodeB.

3. The apparatus of claim 1, wherein the PRBs include a number of resource blocks from a physical downlink shared channel (PDSCH) associated with the E-PDCCH.

4. The apparatus of claim 3, wherein the PDSCH is defined by release 10 of 3$^{rd}$ Generation Partnership Project's (3GPP) long term evolution advanced (LTE-A) communication standard.

5. The apparatus of claim 1, wherein the encoder is further configured to:
determine the predetermined spacing between the selected VRBs based on the aggregation level of the DCI.

6. The apparatus of claim 5, wherein the aggregation level is one of multiple DCI aggregation levels including a first, second, third, and fourth DCI aggregation level.

7. The apparatus of claim 5, wherein the encoder is configured to select one or more VRBs from the adjacent search space candidates associated with the aggregation level $\Lambda$.

8. The apparatus of claim 5, wherein the encoder is configured to select one or more VRBs from the set of search space candidates to ensure a lowest index of VRBs for each E-PDCCH transmission is a multiple of 2.

9. The apparatus of claim 8, wherein the encoder is configured to select one or more VRBs from the set of search space candidates to be potential bearers of DCI to ensure the lowest index of VRBs for each E-PDCCH transmission is a multiple of 2 based on:
$\eta_{VRB}^{E-PDCCH}(\Lambda,k)=((\Lambda+\delta(\Lambda,N_{VRB}^{E-PDCCH}))\cdot m+i)\bmod N_{VRB}^{E-PDCCH}$, wherein $\Lambda$ is one of multiple aggregation levels, wherein $\eta_{VRB}^{E-PDCCH}(\Lambda,k)$ is an index number of one of the number of VRBs for E-PDCCH transmission associated with the aggregation level $\Lambda$ at a subframe k, wherein $$\delta(\Lambda, N_{VRB}^{E-PDCCH}) = \delta(\Lambda, N_{VRB,Base}^{E-PDCCH}) + \frac{N_{VRB}^{E-PDCCH} - N_{VRB,Base}^{E-PDCCH}}{M(\Lambda)} \quad (2)$$

is the VRB spacing between adjacent search space candidates associated with the one of multiple aggregation levels $\Lambda$, wherein $\delta(\Lambda,N_{VRB}^{E-PDCCH})$ is one parameter predefined by higher layer signaling for VRB spacing calculation $\Lambda$, wherein $N_{VRB}^{E-PDCCH}$ is the number of the VRBs allocated for E-PDCCH transmission, wherein m=0, . . . , M($\Lambda$)−1, wherein M($\Lambda$) is a number of the selected VRBs associated with the one of the multiple aggregation levels $\Lambda$, wherein i=0, . . . , ($\Lambda$−1).

10. The apparatus of claim 9, wherein $N_{VRB,Base}^{E-PDCCH}$ is a baseline number of VRBs, wherein the encoder is further configured to insert additional predetermined spacing between the selected VRBs based on a difference between the number of VRBs $N_{RB}^{E-PDCCH}$ and the baseline number $N_{VRB,Base}^{E-PDCCH}$, if the number of VRBs $N_{VRB}^{E-PDCCH}$ is greater than $N_{VRB,Base}^{E-PDCCH}$.

11. The apparatus of claim 5, wherein the encoder is configured to select one or more VRBs from the set of search space candidates to be potential bearers of DCI based on:
$\eta_{VRB}^{E-PDCCH}(\Lambda,k)=(\Delta\cdot m+i)\bmod N_{VRB}^{E-PDCCH}$, if $$\Lambda < \frac{N_{VRB}^{E-PDCCH}}{M(\Lambda)},$$

wherein $\Lambda$ is one of multiple aggregation levels, wherein $\eta_{VRB}^{E-PDCCH}(\Lambda,k)$ is an index number of one of the number of VRBs for E-PDCCH transmission associated with the one of the multiple aggregation levels $\Lambda$ at subframe k, wherein $$\Delta = \frac{N_{VRB}^{E-PDCCH}}{M(\Lambda)},$$

wherein $N_{VRB}^{E-PDCCH}$ is the number of the VRBs allocated for E-PDCCH transmission, wherein m=0, . . . , M(Λ)−1, wherein M(Λ) is a number of the selected VRBs associated with the one of the multiple aggregations levels Λ, wherein i=0, . . . , (Λ−1).

12. The apparatus of claim 5, wherein the encoder is configured to select one or more VRBs from the set of search space candidates to be potential bearers of DCI based on:
$\eta_{VRB}^{E-PDCCH}(\Lambda,k)=(\Lambda \cdot m+i) \bmod N_{VRB}^{E-PDCCH}$, if $$\Lambda >= \frac{N_{VRB}^{E-PDCCH}}{M(\Lambda)},$$

wherein Λ is one of multiple aggregation levels, wherein $\eta_{VRB}^{E-PDCCH}(\Lambda,k)$ is an index number of one of the number of VRBs for E-PDCCH transmission associated with the one of the multiple aggregation levels Λ at a subframe k, wherein $N_{VRB}^{E-PDCCH}$ is the number of the VRBs allocated for E-PDCCH transmission, wherein m=0, . . . , M(Λ)−1, wherein M(Λ) is a number of the selected VRBs associated with Λ, wherein i=0, . . . , (Λ−1).

13. The apparatus of claim 5, wherein the encoder is configured to select one or more VRBs from the set of search space candidates based on:
$\eta_{VRB}^{E-PDCCH}(\Lambda,k)=((\Lambda+\delta(\Lambda,N_{VRB}^{E-PDCCH})) \cdot m+i) \bmod N_{VRB}^{E-PDCCH}$, wherein Λ is one of multiple aggregation levels, wherein $\eta_{VRB}^{E-PDCCH}(\Lambda,k)$ is an index number of one of the number of VRBs to receive DCI associated with the one of the multiple aggregation levels Λ at a subframe k, wherein $N_{VRB}^{E-PDCCH}$ is the number of the VRBs, wherein $\delta(\Lambda, N_{VRB}^{E-PDCCH})$ is VRB spacing between the adjacent search space candidates associated with the one of the multiple aggregation levels Λ, wherein m=0, . . . , M(Λ)−1 and M(Λ) is a number of the selected VRBs associated with the one of the multiple aggregation levels Λ, wherein i=0, . . . , (Λ−1).

14. The apparatus of claim 5, wherein the encoder is configured to select one or more VRBs from the set of search space candidates based on:
$\eta_{VRB}^{E-PDCCH}(\Lambda,k)=(\Lambda \cdot m+i+\Lambda \cdot M(\Lambda) \cdot \beta(\Lambda)) \bmod N_{VRB}^{E-PDCCH}$, wherein Λ is the aggregation level of DCI, wherein $\eta_{VRB}^{E-PDCCH}(\Lambda,k)$ is an index number of one of the number of VRBs for E-PDCCH transmission associated with the aggregation level Λ at subframe k, wherein β(Λ) is the candidate set identifier, wherein $N_{VRB}^{E-PDCCH}$ is the number of the VRBs, wherein m=0, . . . , M(Λ)−1 and M(Λ) is a number of the selected VRBs associated with Λ, wherein i=0, . . . , (Λ−1).

15. An article of manufacture having one or more non-transitory computer readable media including a plurality of instructions which, when executed by one or more processors, cause an apparatus to:

determine a set of search space candidates of an enhanced-physical downlink control channel (E-PDCCH) based on an aggregation level of downlink control information (DCI), number of virtual resource blocks (VRBs) of the E-PDCCH, a predetermined spacing that is to provide an even distribution of the search space candidates across the VRBs of the E-PDDCH to enable a frequency scheduling gain, and a candidate set identifier, the set of search space candidates to be potential bearers of DCI;

select one or more VRBs from the set of search space candidates; and encode DCI onto ones of the number of VRBs associated with the set of search space candidates; and map the number of VRBs of the E-PDCCH to physical resource blocks (PRBs) for transmission to a user equipment in a downlink frame.

16. The article of manufacture of claim 15, wherein the apparatus includes an eNodeB.

17. The article of manufacture of claim 15, wherein the instructions cause an encoder module of the apparatus to determine the set of search space candidates, select the one or more VRBs, and encode the DCI.

18. An apparatus, comprising:
a communications module configured to receive one or more downlink transmissions from a base station via an enhanced-physical downlink control channel (E-PDCCH); and a decoder module coupled to the communications module and configured to:
identify a set of search space candidates based on aggregation levels of downlink control information (DCI), a number of virtual resource blocks (VRBs) of the E-PDCCH, and a predetermined spacing that is to provide an even distribution of the search space candidates across the VRBs of the E-PDDCH to enable a frequency scheduling gain; and
blindly decode the set of search space candidates to retrieve the DCI.

19. The apparatus of claim 18, the decoder module is further configured to determine a number of gaps of VRBs between adjacent ones of the search space candidates based on the aggregation levels and the number of VRBs.

20. The apparatus of claim 19, wherein the search space candidates have been equally spaced among the number of VRBs in a first and a second of the aggregations levels.

21. The apparatus of claim 18, wherein one of the decoder module or the communications module determines which of the aggregation levels of DCI to decode based on a strength of a received communication signal from an eNodeB.

* * * * *

UNITED STATES PATENT AND TRADEMARK OFFICE
CERTIFICATE OF CORRECTION

| | | |
|---|---|---|
| PATENT NO. | : 8,755,348 B2 | Page 1 of 1 |
| APPLICATION NO. | : 13/810890 | |
| DATED | : June 17, 2014 | |
| INVENTOR(S) | : Hong He et al. | |

It is certified that error appears in the above-identified patent and that said Letters Patent is hereby corrected as shown below:

In the Claims

Column 16

Line 40, "...claim 18, the decoder module..." should read --...claim 18, wherein the decoder module...--.

Signed and Sealed this
Second Day of June, 2015

Michelle K. Lee
*Director of the United States Patent and Trademark Office*